(12) United States Patent
Beck et al.

(10) Patent No.: US 9,518,636 B2
(45) Date of Patent: Dec. 13, 2016

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/780,683

(22) PCT Filed: Feb. 25, 2014

(86) PCT No.: PCT/EP2014/053594
§ 371 (c)(1),
(2) Date: Sep. 28, 2015

(87) PCT Pub. No.: WO2014/154420
PCT Pub. Date: Oct. 2, 2014

(65) Prior Publication Data
US 2016/0053866 A1     Feb. 25, 2016

(30) Foreign Application Priority Data

Mar. 27, 2013  (DE) .......................... 10 2013 205 387

(51) Int. Cl.
*F16H 3/66*     (2006.01)
*F16H 3/44*     (2006.01)

(52) U.S. Cl.
CPC ........... *F16H 3/66* (2013.01); *F16H 2003/445* (2013.01); *F16H 2003/447* (2013.01);
(Continued)

(58) Field of Classification Search
CPC ................ F16H 3/66; F16H 2200/2097; F16H 2200/2046; F16H 2200/0065; F16H 2200/2012
(Continued)

(56) References Cited

U.S. PATENT DOCUMENTS

| | | | |
|---|---|---|---|
| 2009/0197734 A1 | 8/2009 | Phillips et al. | |
| 2016/0040754 A1* | 2/2016 | Schoolcraft | F16H 3/64 |
| | | | 475/269 |
| 2016/0061298 A1* | 3/2016 | Beck | F16H 3/66 |
| | | | 475/275 |

FOREIGN PATENT DOCUMENTS

| | | |
|---|---|---|
| DE | 10 2008 041200 | 2/2010 |
| DE | 10 2009 019046 | 11/2010 |

(Continued)

OTHER PUBLICATIONS

German Patent Office Search Report, Nov. 29, 2013.
PCT Search Report and Written Opinion, May 27, 2014.

*Primary Examiner* — Roger Pang
(74) *Attorney, Agent, or Firm* — Dority & Manning, P.A.

(57) ABSTRACT

A transmission, in particular a multi-speed transmission for a motor vehicle, includes a housing, a drive shaft, an output shaft, at least four planetary gear sets, whereas each of the planetary gear sets comprises one sun gear, at least one planet, one planetary carrier and one ring gear, along with several shift elements in the form of at least four clutches and at least two brakes. The sun gear of the fourth planetary gear set is connected to the housing. The planetary carrier of the fourth planetary gear set is connectable through the fourth clutch to the output shaft. The second brake is connected to the sun gear of the first planetary gear set. The first brake is connected to the ring gear of the first planetary (Continued)

gear set and to the planetary carrier of the first planetary gear set. The first brake is connectable through the third clutch to the drive shaft.

9 Claims, 9 Drawing Sheets

(52) U.S. Cl.
CPC ............... *F16H 2200/0065* (2013.01); *F16H 2200/2012* (2013.01); *F16H 2200/2046* (2013.01); *F16H 2200/2097* (2013.01)

(58) Field of Classification Search
USPC .......................................... 475/275–291, 330
See application file for complete search history.

(56) References Cited

FOREIGN PATENT DOCUMENTS

| DE | 102013205384 A1 | * | 10/2014 | ............... F16H 3/66 |
| EP | EP 1435477 A2 | * | 7/2004 | ............. F16H 3/666 |
| JP | 2006-349153 | | 12/2006 | |
| WO | WO 2012/052284 | | 4/2012 | |

* cited by examiner

| Gear | Engaged Shifting Elements | | | | | | Ratio i | Gear Step φ |
|---|---|---|---|---|---|---|---|---|
| | Brake | | Clutch | | | | | |
| | B1 | B2 | K1 | K2 | K3 | K4 | | |
| V1 |  | X |  | X |  | X | 4,515 | 1,741 |
| V2 |  | X |  |  | X | X | 2,593 | 1,556 |
| V3 |  |  |  | X | X | X | 1,667 | 1,316 |
| V4 |  |  | X | X |  | X | 1,267 | 1,267 |
| V5 |  |  | X | X | X |  | 1,000 | 1,238 |
| V6 |  | X | X |  | X |  | 0,808 | 1,147 |
| V7 |  | X | X | X |  |  | 0,704 | 1,173 |
| V8 | X | X | X |  |  |  | 0,600 | 1,193 |
| V9 | X |  | X | X |  |  | 0,503 | Gesamt 8,977 |
| R | X |  |  | X |  | X | -3,454 | |
| VM I |  | X | X |  |  | X | 1,267 | |
| VM II | X |  | X |  |  | X | 1,267 | |
| VM III |  |  | X |  | X | X | 1,267 | |

Fig. 2

TRANSMISSION FOR A MOTOR VEHICLE

FIELD OF THE INVENTION

The invention relates to a transmission, in particular a multi-speed transmission for a motor vehicle, including a housing, a drive shaft, an output shaft, at least four planetary gear sets, whereas each of the planetary gear sets includes one sun gear, at least one planet, one planetary carrier and one ring gear, along with several shift elements in the form of at least four clutches and at least two brakes.

BACKGROUND

Such transmissions are known, for example, from WO 2012/052284 A1. In WO 2012/052284 A1, a multi-speed transmission with six forward gears and one reverse gear is shown, which comprises four planetary gear sets, seven rotatable shafts and five shift elements, whereas the sun gear of the first planetary gear set is connected to the sixth shaft, which is attachable through a first brake to the housing of the transmission, whereas the bar of the first planetary gear set is connected to the fifth shaft, which is connected to the sun gear of the second planetary gear set and is attachable through a second brake to the housing, whereas the drive shaft is connected to the ring gear of the first planetary gear set and to the sun gear of the third planetary gear set and is detachably connectable through a clutch to the seventh shaft connected to the bar of the third planetary gear set and the ring gear of the fourth planetary gear set, whereas the fourth shaft is connected to the ring gear of the third planetary gear set and to the bar of the second planetary gear set and is connectable through a third brake to the housing, whereas the output shaft is connected to the ring gear of the second planetary gear set and to the bar of the fourth planetary gear set and whereas the sun gear of the fourth planetary gear set is connected to the third shaft, which is attachable through a fourth brake to the housing.

The disadvantage here is that internal shift elements, such as multi-disk clutches or brakes, are hydraulically actuated. This hydraulic actuation leads to high hydraulic losses. In order to avoid such actuation losses, providing electro-mechanical or electro-hydraulic actuation has been proposed. In turn, the disadvantage here is that the shift elements, primarily clutches, are difficult to access, in particular if good gearing efficiency and low component stresses with low construction costs are desired.

SUMMARY OF THE INVENTION

As such, a task of the present invention is to provide a transmission for a motor vehicle, which has a high degree of efficiency, low component stress and low construction costs. Moreover, it is a task of the present invention to provide a transmission for a motor vehicle that features easy accessibility for its shift elements from the outside. An additional task of the present invention is to provide an alternative transmission for a motor vehicle. Additional objects and advantages of the invention will be set forth in part in the following description, or may be obvious from the description, or may be learned through practice of the invention.

The present invention solves the tasks for a transmission, in particular a multi-clutch transmission for a motor vehicle, and includes a housing, a drive shaft, an output shaft, at least four planetary gear sets, whereas each of the planetary gear sets comprises one sun gear, at least one planet, one planetary carrier and one ring gear, along with several shift elements in the form of at least four clutches and at least two brakes. The sun gear of the fourth planetary gear set is connected to the housing. The planetary carrier of the fourth planetary gear set is connectable through the fourth clutch to the drive shaft. The second brake is connected to the sun gear of the first planetary gear set. The first brake is connected to the ring gear of the first planetary gear set and to the planetary carrier of the first planetary gear set. The first brake is connectable through the third clutch to the drive shaft.

The invention also solves the task for a motor vehicle, in particular for a passenger car or a truck, with a transmission in accordance with the invention.

The invention also solves the task with a method for operating a transmission with two brakes and four clutches. A first gear is formed by means of an open first brake, a locked second brake, an open first clutch, a locked second clutch, an open third clutch and a locked fourth clutch. A second gear is formed by means of an open first brake, a locked second brake, an open first clutch, an open second clutch, a locked third clutch and a locked fourth clutch. A third gear is formed by means of an open first brake, an open second brake, an open first clutch, a locked second clutch, a locked third clutch and a locked fourth clutch. A fourth gear is formed by means of an open first brake, an open second brake, a locked first clutch, a locked second clutch, an open third clutch and a locked fourth clutch; or by means of an open first brake, a locked second brake, a locked first clutch, an open second clutch, an open third clutch and a locked fourth clutch; or is formed by means of a locked first brake, an open second brake, a locked first clutch, an open second clutch, an open third clutch and a locked fourth clutch; or by means of an open first brake, an open second brake, a locked first clutch, an open second clutch, a locked third clutch and a locked fourth clutch. A fifth gear is formed by means of an open first brake, an open second brake, a locked first clutch, a locked second clutch, a locked third clutch and an open fourth clutch. A sixth gear is formed by means of an open first brake, a locked second brake, a locked first clutch, an open second clutch, a locked third clutch and an open fourth clutch. A seventh gear is formed by means of an open first brake, a locked second brake, a locked first clutch, a locked second clutch, an open third clutch and an open fourth clutch. An eighth gear is formed by means of a locked first brake, a locked second brake, a locked first clutch, an open second clutch, an open third clutch and an open fourth clutch. A ninth gear is formed by means of a locked first brake, an open second brake, a locked first clutch, a locked second clutch, an open third clutch and an open fourth clutch and that a reverse gear is formed by means of a locked first brake, an open second brake, an open first clutch, a locked second clutch, an open third clutch and a locked fourth clutch.

One of the advantages obtained thereby is that, in this manner, good accessibility of all shift elements is ensured. In addition, the construction costs are low, which means lower costs and weight of the transmission.

It is particularly preferable that, through the drive shaft, a torque or a rotational movement of a drive shaft, for example an internal combustion engine, is introduced into the transmission. In a preferred manner, a start-up element, such as a hydrodynamic torque converter or a fluid clutch, is located between the drive shaft and the output shaft.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

In particular, two elements are described as connected to each other if there is a fixed (in particular, a torque-proof) connection between the elements. In particular, such connected elements rotate with the same rotational speed.

Furthermore, two elements are described as connectable if there is a detachable connection between such elements. In particular, such elements rotate with the same rotational speed if the connection exists.

The various components and elements of the specified invention may be connected to each other through a shaft or a connection element, or also directly, for example by means of a welded connection, crimping connection or another connection.

In the description, in particular in the claims, a "clutch" is preferably understood as a shift element that, depending on the operating state, allows a relative movement between two components or represents a connection for transferring torque. "Relative motion" is understood (for example) as a rotation of two components, whereas the rotational speed of the first component and the rotational speed of the second component are different from one another. Moreover, the rotation of only one of the two components is possible, while the other component is at a standstill or is rotating in the opposite direction.

In the following, a "non-actuated clutch" is understood as an open clutch. This means that a relative movement between the two components is possible. With an actuated or locked clutch, the two components rotate accordingly at the same rotational speed in the same direction.

In the description, in particular in the claims, a "brake" is understood as a shift element that is connected on one side to a stationary element, such as a housing, and on the other side to a rotatable element.

In the following, a "non-actuated brake" is understood as an open brake. This means that the rotating component is freely rotatable; that is, the brake preferably has no influence on the rotational speed of the rotating component. With an actuated or locked brake, there is a reduction in the rotational speed of the rotatable component up to a standstill; that is, a firm connection between the rotatable element and the stationary element can be produced. In this context, "element" and "component" are equivalent.

As a general rule, the use of shift elements that are locked in a non-actuated state and open in an actuated state is also possible. Accordingly, the allocations between function and shifting state of the shift elements described above are understood in reverse order. With the following embodiments on the basis of the figures, an arrangement in which an actuated shift element is locked and a non-actuated shift element is open is initially used as the basis.

A planetary gear set comprises one sun gear, one planetary carrier or bar, as the case may be, and one ring gear. Planetary gears or planets that mesh with the toothing of the ring gear and/or with the toothing of the sun gear are rotatably mounted on the planetary carrier or the bar, respectively.

In the following, a negative planetary gear set describes a planetary gear set with a planetary carrier on which the planetary gears are rotatably mounted, with one sun gear and one ring gear, whereas the toothing of at least one of the planetary gears meshes with both the toothing of the sun gear and with the toothing of the ring gear, by which the ring gear and the sun gear rotate in opposite directions, if the sun gear rotates with a fixed planetary carrier.

A positive planetary gear set differs from the negative planetary gear set just described in that the positive planetary gear set features inner and outer planetary gears, which are rotatably mounted on the planetary carrier. Thereby, the toothing of the inner planetary gears meshes, on the one hand, with the toothing of the sun gear and, on the other hand, with the toothing of the outer planetary gears. The toothing of the outer planetary gears also meshes with the toothing of the ring gear. This has the consequence that, with a fixed planetary carrier, the ring gear and the sun gear rotate in the same direction of rotation.

A particularly compact transmission can be realized through the use of planetary gear sets, by which a high degree of freedom in the arrangement of the transmission in the vehicle is achieved.

"Elements of a planetary gear set" are understood in particular as the sun gear, the ring gear, the planetary carrier or bar, respectively, and the planetary carrier or planets, respectively, of the planetary gear set.

It is particularly preferable that the shift elements are able to be actuated selectively, thus individually and in line with demand, by which different gears can be realized through different transmission ratio relationships between the drive shaft and the output shaft. The higher the number of gears, the finer a gear shifting can be realized with a large gear spread, and thus, for example, an internal combustion engine of a motor vehicle can be operated in an optimal rotational speed range and thus as efficiently as possible. At the same time, this contributes to increased driving comfort, since the internal combustion engine preferably can be operated at a low rotational speed level. Thus, for example, noise emissions that arise through the operation of the internal combustion engine are reduced.

The term "front-transverse arrangement" is understood as an arrangement with which the drive shaft, for example an internal combustion engine, is installed transversely to a direction of travel in a motor vehicle, and preferably the wheels of a front axle can be driven by the drive shaft or the transmission, as the case may be. Furthermore, the shift elements may be formed in such a manner that energy is required for a change in the shifting state of the shift elements, but not for maintaining the shifting state itself.

For this purpose, actuated shift elements in line with demand, such as electromechanical shift elements or electromagnetic shift elements, are suitable in a particular way. Particularly when compared to conventional hydraulically actuated shift elements, they are characterized by a particularly low and efficient energy demand, since they can be operated nearly loss-free. In addition, in an advantageous manner, permanently holding a control pressure for the actuation of the (for example) conventional hydraulic shift elements, and/or permanently applying the shift element in the shifted state with the required hydraulic pressure, can be avoided. Thereby, additional components such as a hydraulic pump (for example) may be omitted, to the extent that they are solely used for the control and supply of conventional hydraulically actuated shift elements. If the additional components are supplied with lubricants by the same hydraulic pump, and not by a separate lubrication pump, at least they can be dimensioned smaller. Moreover, any leaks at the oil transfer points of the hydraulic circuit that may arise, particularly with rotating components, are eliminated. It is particularly preferable that this also contributes to increased efficiency of the transmission in the form of a higher degree of efficiency.

Upon the use of actuated shift elements in line with demand of the type specified above, it is particularly advantageous if they are easily accessible from the outside. Among other things, that has the advantage that the required shifting energy can be easily fed to the shift elements. Therefore, the shift elements are, particularly preferably, arranged so that they are easily accessible from the outside. Within the context of the shift elements, "easily accessible from the outside" means that no additional components are arranged between the housing of the transmission and the shift element, and/or that the shift elements are, particularly preferably, arranged on the output shaft or on the drive shaft.

In the description, in particular in the claims, the term "binding ability" is preferably understood such that, with a different geometrical positioning, the same connection or binding of the interfaces is ensured, without the individual connection elements or shafts crossing each other.

The term "stationary transmission ratio" is understood as that transmission ratio that is realized by the transmission ratio relationship between the sun gear and the ring gear of the respective planetary gear set if the planetary carrier or bar, as the case may be, is fixed.

Additional advantageous embodiments, characteristics and advantages of the invention are described in the subclaims.

Advantageously, the planetary gear sets are arranged, in particular geometrically, behind one another in the transmission. This allows easy manufacturing and the easier accessibility of the planetary gear sets in the event of maintenance.

Beneficially, the drive shaft is connectable through the first clutch to the planetary carrier of the third planetary gear set, and the sun gear of the third planetary gear set is connected to the planetary carrier of the second planetary gear set, to the planetary carrier of the first planetary gear set and to the ring gear of the fourth planetary gear set, and the ring gear of the third planetary gear set is connected to the output shaft. Thus, by means of the first clutch, in a flexible manner, power and torque may be transferred from the drive shaft to the third planetary gear set and further at all other planetary gear sets through the third planetary gear set.

Advantageously, the drive shaft is connected to the planetary carrier of the third planetary gear set, and the ring gear of the third planetary gear set is connected to the planetary carrier of the second planetary gear set, to the planetary carrier of the first planetary gear set and to the ring gear of the fourth planetary gear set, and the ring gear of the third planetary gear set is connectable through the first clutch to the output shaft. Thus, for example, power and torque are transferred from the drive shaft directly to the third planetary gear set and, depending on the need, they are coupled to the output shaft in a flexible manner.

Beneficially, the drive shaft is connected to the planetary carrier of the third planetary gear set, and the sun gear of the third planetary gear set is connectable through the first clutch to the planetary carrier of the second planetary gear set, to the planetary carrier of the first planetary gear set and to the ring gear of the fourth planetary gear set, and the ring gear of the third planetary gear set is connected to the output shaft. Firstly, power and torque may thus be transferred directly from the drive shaft to the third planetary gear set, and further directly to the output shaft by means of the third planetary gear set. Other planetary gear sets may be connected by means of the first clutch to the third planetary gear set in a flexible manner.

Advantageously, the drive shaft is connectable through the second clutch to the sun gear of the second planetary gear set, and the ring gear of the second planetary gear set is connected to the second brake. The advantage of this in turn is that the drive shaft is connectable to the central element in the form of the sun gear of the second planetary gear set; at the same time, the ring gear of the planetary gear set can be coupled in a flexible manner with the housing through the second brake.

Beneficially, the drive shaft is connectable to the sun gear of the second planetary gear set, and the ring gear of the second planetary gear set is connectable through the second clutch to the second brake and to the sun gear of the first planetary gear set. The advantage thereby is that force and torque can be transferred directly from the drive shaft to the second planetary gear set. Moreover, in a flexible manner, the second planetary gear set can be connected through the second clutch to the second brake and to the first planetary gear set.

Additional important characteristics and advantages of the invention arise from the drawings, and from the associated description of the figures on the basis of the drawings.

It is understood that the characteristics specified above and the characteristics that are still to be described below are usable not only in the indicated combination, but also in other combinations or alone, without leaving the framework of the present invention.

BRIEF DESCRIPTION OF THE DRAWINGS

Preferred designs and embodiments of the invention are presented in the drawings and are described more specifically in the following description, whereas the same reference signs refer to identical or similar or functionally identical components or elements.

The following are shown, each in schematic form:

FIG. 2 is a shifting matrix for a transmission in accordance with the first embodiment of the present invention;

DETAILED DESCRIPTION

Figure 1:
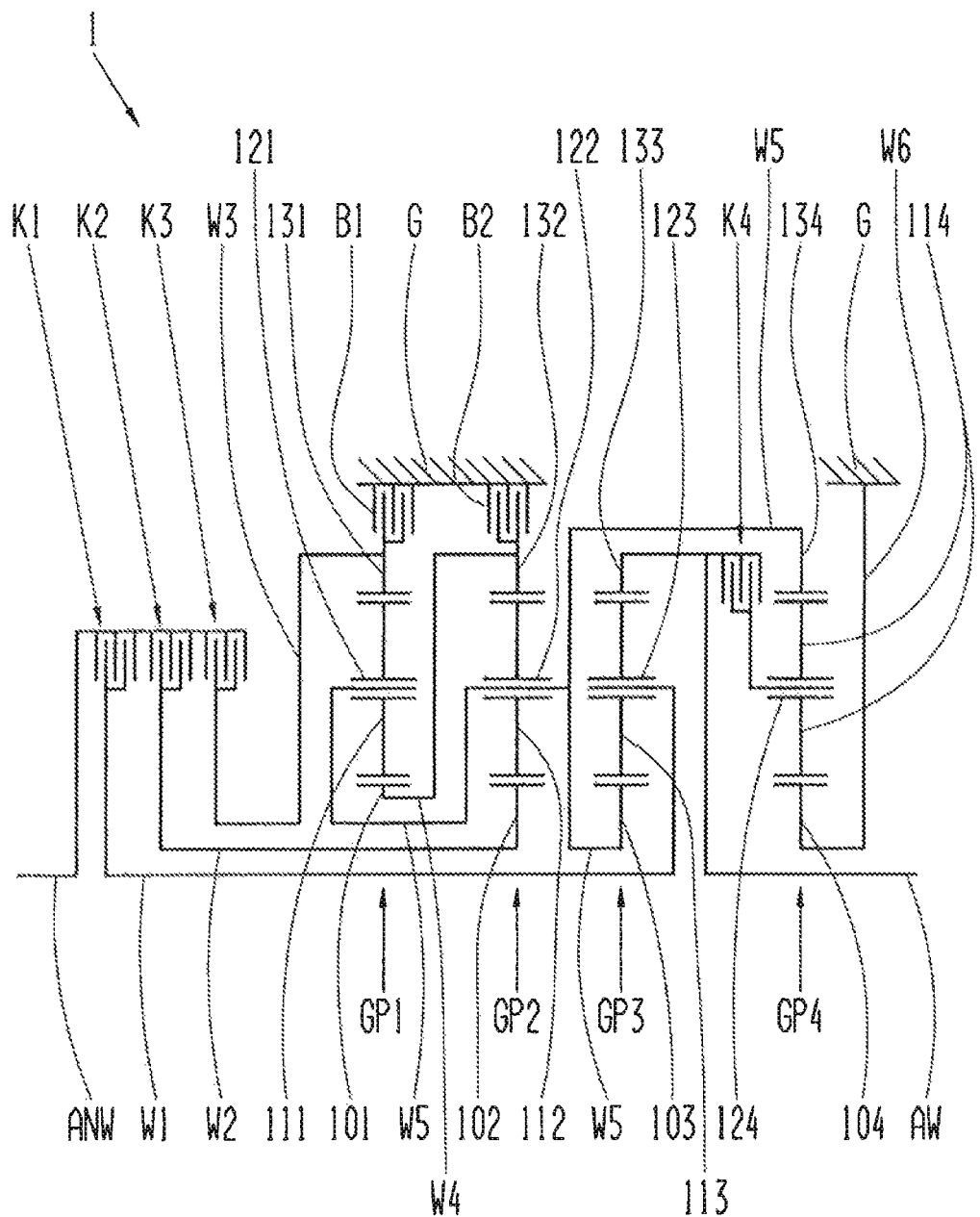
FIG. 1 is a transmission in accordance with a first embodiment of the present invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a transmission in accordance with a first embodiment of the present invention.

In FIG. 1, reference sign 1 designates a multi-speed transmission. The multi-stage transmission 1 features six shift elements in the form of four clutches K1, K2, K3, K4 and two brakes B1, B2. By means of the four clutches K1, K2, K3, K4, the drive side can be coupled or connected to the output side of the transmission for transferring power and torques through shafts and/or the planetary gear sets. For this purpose, the first clutch K1, the second clutch K2 and the third clutch K3 are connected to the drive shaft ANW on the drive side. The first clutch K1 is also connected to a first shaft W1, such that, when actuated, the first clutch K1 transfers power and torque from the drive shaft ANW to the first shaft W1. This correspondingly applies for the second clutch K2 and the third clutch K3. Upon locking the second clutch K2, power and torque are transferred from the drive shaft ANW to the second shaft W2; upon locking the third clutch K3, power and torque are transferred from the drive shaft ANW to the third shaft W3.

In the transmission 1, four planetary gear sets GP1, GP2, GP3, GP4 and six shafts W1, W2, W3, W4, W5 and W6 are also arranged.

Below, the general structure of the first planetary gear set GP1, the second planetary gear set GP2, the third planetary gear set GP3 and the fourth planetary gear set GP4 will initially be described. The planetary gear sets GP1, GP2, GP3 and GP4 specified above are constructed in the usual manner, and in each case feature a central sun gear 101, 102, 103, 104, which interacts with a planet 111, 112, 113, 114 for the transfer of power and torques. The planet 111, 112, 113, 114 is rotatably mounted on a bar/planetary carrier 121, 122, 123, 124. On the radially outer side of the planet 111, 112, 113, 114, a ring gear 131, 132, 133, 134 is arranged, in which the respective planet 111, 112, 113, 114 is engaged for the transfer of power and torques. The bar or planetary carrier 121, 122, 123, 124, as the case may be, is further connected to a shaft. The individual reference signs for sun gear, planet, planetary carrier/bar and ring gear can be seen in FIG. 1. For the sake of clarity, the reference signs have been omitted in the additional figures.

The six different shafts W1, W2, W3, W4, W5 and W6 will now be described.

The first shaft W1 connects the first clutch K1 and the bar 123 of the third planetary gear set GP3. The second shaft W2 connects the second clutch K2 to the sun gear 102 of the second planetary gear GP2. The third shaft W3 connects the third clutch K3 to the ring gear 131 of the first planetary gear set GP1, and can be coupled through a brake B1 with the housing G. The fourth shaft W4 connects the sun gear 101 of the first planetary gear set GP1 and the ring gear 132 of the second planetary gear set GP2, and can be coupled through a brake B2 with the housing G. The fifth shaft W5 connects the bar 121 of the first planetary gear set GP1, the bar 122 of the second planetary gear set GP2, the sun gear 103 of the third planetary gear set GP3 and the ring gear 134 of the fourth planetary gear set GP4. The sixth shaft W6 is connected, on the one hand, in a torque-proof manner to the housing G, and, on the other hand, to the sun gear 104 of the fourth planetary gear set GP4.

The output shaft AW is connectable, on the one hand, to the ring gear 133 of the third planetary gear set GP3 and, on the other hand, through a fourth clutch K4 to the bar 124 of the fourth planetary gear set GP4.

FIG. 2 shows a shifting matrix for a transmission in accordance with the first embodiment of the present invention.

FIG. 2 presents a shifting matrix for a transmission 1 in accordance with FIG. 1. Downwards in a vertical direction to this, nine forward gears, designated with the reference signs V1 to V9, and one reverse gear designated with R, are initially shown. Furthermore, three alternative presentations of the fourth forward gear V4, designated with the reference signs $VM^I$, $VM^I$ and $VM^{III}$, are shown. The respective shift elements are shown horizontally, whereas the two brakes B1, B2 and then the four clutches K1, K2, K3 and K4 are initially shown. Furthermore, the respective transmission ratio relationship/ratio i and the corresponding gear jump/step ϕ is shown between two consecutive gears/gear steps. In this respect, the respective gear jump is presented in the shifting matrix between two adjacent gears/gear steps. With each of the alternative presentations of the fourth forward gear V4, only the transmission ratios are indicated.

The entries left empty in the shifting matrix, thus, for example, with the forward gear V1, with the first brake B1 along with the first clutch K1 and the third clutch K3 indicate that the corresponding shift element or brakes or clutch, as the case may be, is open; i.e., that the shift element thereby does not transfer any power or torque from the respective shafts or elements of the transmission attached to the shift element or connected to it. An entry in the shifting matrix provided with a cross designates a correspondingly actuated or locked shift element, thus in the shifting matrix, for example, with the forward gear V1, with the brake B2 and with the clutches K2 and K4. To the extent not otherwise described, the shift elements B1, B2, K1, K2, K3, K4 are open.

In order to present the first forward gear V1 by means of the transmission 1 in accordance with FIG. 1, the brake B2 and the clutches K2 and K4 are locked. The transmission ratio relationship i is 4.515. In order to present the second forward gear V2, the brake B2 and the clutches K3 and K4 are locked. The transmission ratio relationship i is 2.593.

In order to present the third forward gear V3, all of the brakes are open and the clutches K2, K3 and K4 are locked. The transmission ratio relationship i is 1.667. In order to present the fourth forward gear V4, all of the brakes B1, B2 are open and the clutches K1, K2 and K4 are locked. The transmission ratio relationship i is 1.267.

In order to present the fifth forward gear V5, all of the brakes are open and the clutches K1, K2, K3 are locked. The transmission ratio relationship i is 1.000. In order to present the sixth forward gear V6, the brake B2 and the clutches K1 and K3 are locked. The transmission ratio relationship i is 0.808.

In order to present the seventh forward gear V7, the brake B2 and the clutches K1 and K2 are locked. The transmission ratio relationship i is 0.704. In order to present the eighth forward gear V8, all of the brakes B1, B2 and the clutch K1 are locked. The transmission ratio relationship i is 0.600.

In order to present the ninth forward gear V9, the brake B1 and the clutches K1 and K2 are locked. The transmission ratio relationship i is 0.503. In order to present the reverse gear R, the brake B1 and the clutches K2 and K4 are locked. The transmission ratio relationship i is −3.454.

With the first alternative presentation $VM^I$, the brake B2 and the clutches K1 and K4 are locked. The transmission ratio relationship i is 1.267. With the second alternative presentation $VM^{II}$, the brake B1 and the clutches K1 and K4 are locked. The transmission ratio relationship i is 1.267. With the third alternative presentation $VM^{III}$, all of the brakes are open and the clutches K1, K3 and K4 are locked. The transmission ratio relationship i is 1.267.

The gear jump ϕ between the first forward gear V1 and the second forward gear V2 is 1.741, and between the second forward gear V2 and the third forward gear V3 is 1.556. The gear jump ϕ between the third forward gear V3 and the fourth forward gear V4 is 1.316, and between the fourth forward gear V4 and the fifth forward gear V5 is 1.267. The gear jump φ between the fifth forward gear V5 and the sixth forward gear V6 is 1.236, and between the sixth forward gear V6 and the seventh forward gear V7 is 1.147. The gear jump φ between the seventh forward gear V7 and the eighth forward gear V8 is 1.173, and between the eighth forward gear V8 and the ninth forward gear V9 is 1.193. The entire gear jump is 8.977.

Thereby, the first planetary gear set GP1 features a stationary transmission ratio of i0=−1.800, the second planetary gear set GP2 features a stationary transmission ratio of i0=−1.609, the third planetary gear set GP3 features a stationary transmission ratio i0=−1.500 and the fourth planetary gear set GP4 features a stationary transmission ratio of i0=−1.500.

Figure 3:
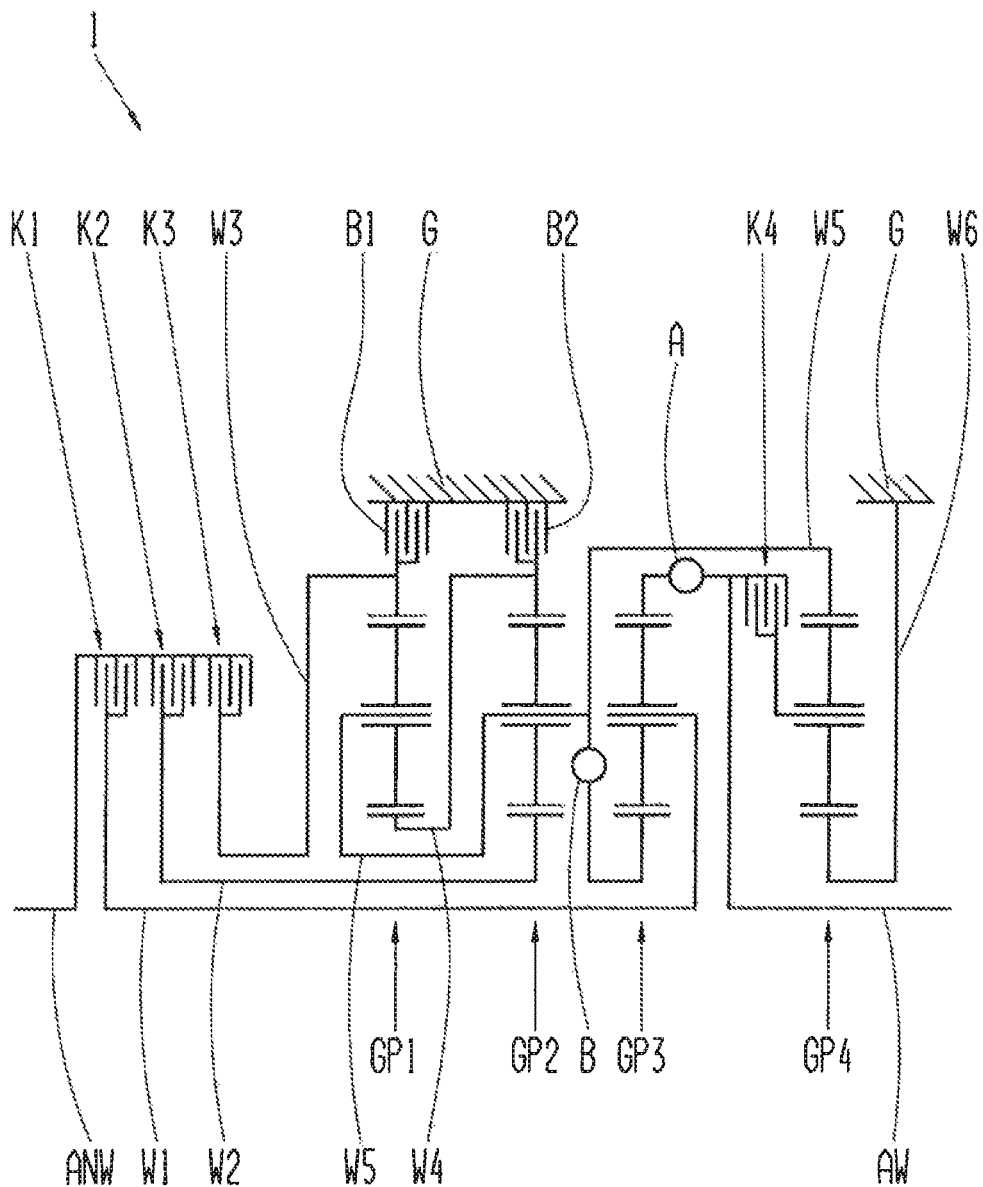
FIG. 3 is a transmission in accordance with a second embodiment of the present invention.

FIG. 3 shows a transmission in accordance with a second embodiment of the present invention.

FIG. 3 shows a transmission 1 in accordance with FIG. 1. In FIG. 3, two alternative positions A, B for the first clutch K1 can be viewed, with which the first clutch K1 can be arranged in a manner effectively equal to the position in accordance with FIG. 1.

The first alternative position A for the first clutch K1 is located between the ring gear 133 of the third planetary gear set GP3 and the section of the output shaft AW that is connected to the fourth clutch K4.

The second alternative position B for the first clutch K1 is located between the sun gear 103 of the third planetary gear set GP3 and the section of the fifth shaft W5 that connects the bar 122 of the second planetary gear set GP2 to the ring gear 134 of the fourth planetary gear set GP4.

Figure 4:
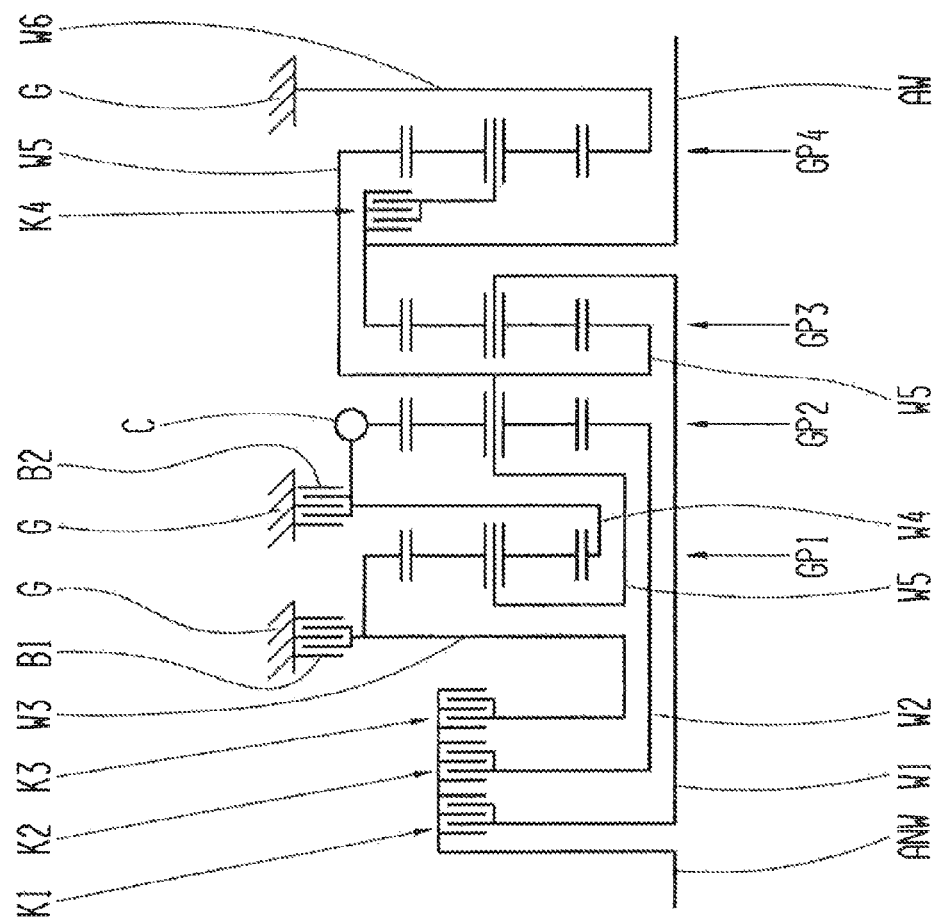
FIG. 4 is a transmission in accordance with a third embodiment of the present invention.

FIG. 4 shows a transmission in accordance with a third embodiment of the present invention.

FIG. 4 shows a transmission 1 in accordance with FIG. 1. In FIG. 4. alternative positions C for the second clutch K2 can be viewed, with which the second clutch K2 can be arranged in a manner effectively equal to the position in accordance with FIG. 1.

The alternative position C for the second clutch K2 is located between the ring gear 132 of the second planetary gear GP2 and the section of the fourth shaft W4 that connects the sun gear 101 of the first planetary gear set GP1 to the brake B2.

Figure 5:
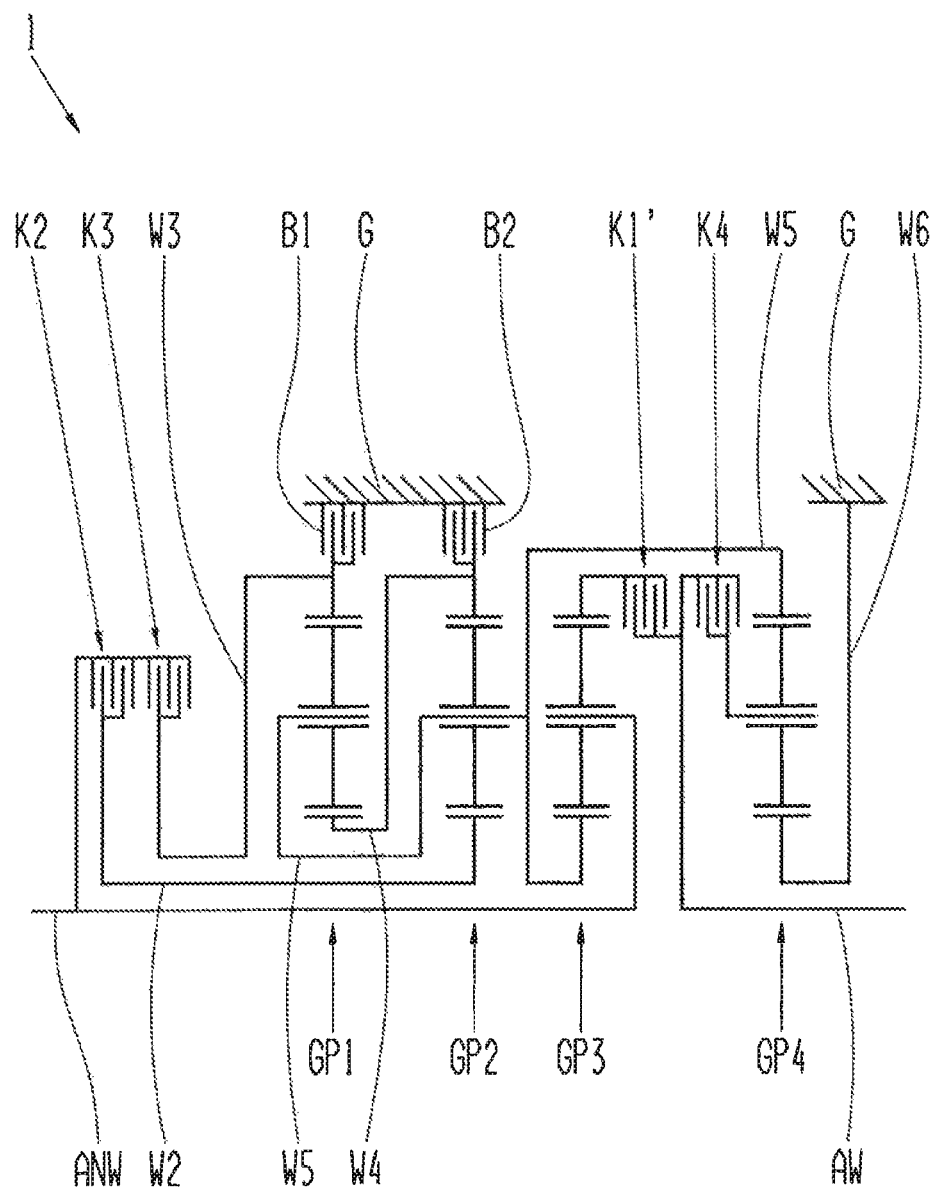
FIG. 5 is a transmission in accordance with a fourth embodiment of the present invention.

FIG. 5 shows a transmission in accordance with a fourth embodiment of the present invention.

FIG. 5 essentially shows a transmission 1 in accordance with FIG. 1. In contrast to the transmission 1 in accordance with FIG. 1, with the transmission 1 in accordance with FIG. 5, the first clutch K1, here designated with the reference sign K1', is now arranged at the first alternative position A in accordance with FIG. 3. The first shaft W1 is omitted. The drive shaft ANW now interacts directly with the bar 123 of the third planetary gear set GP3.

Figure 6:
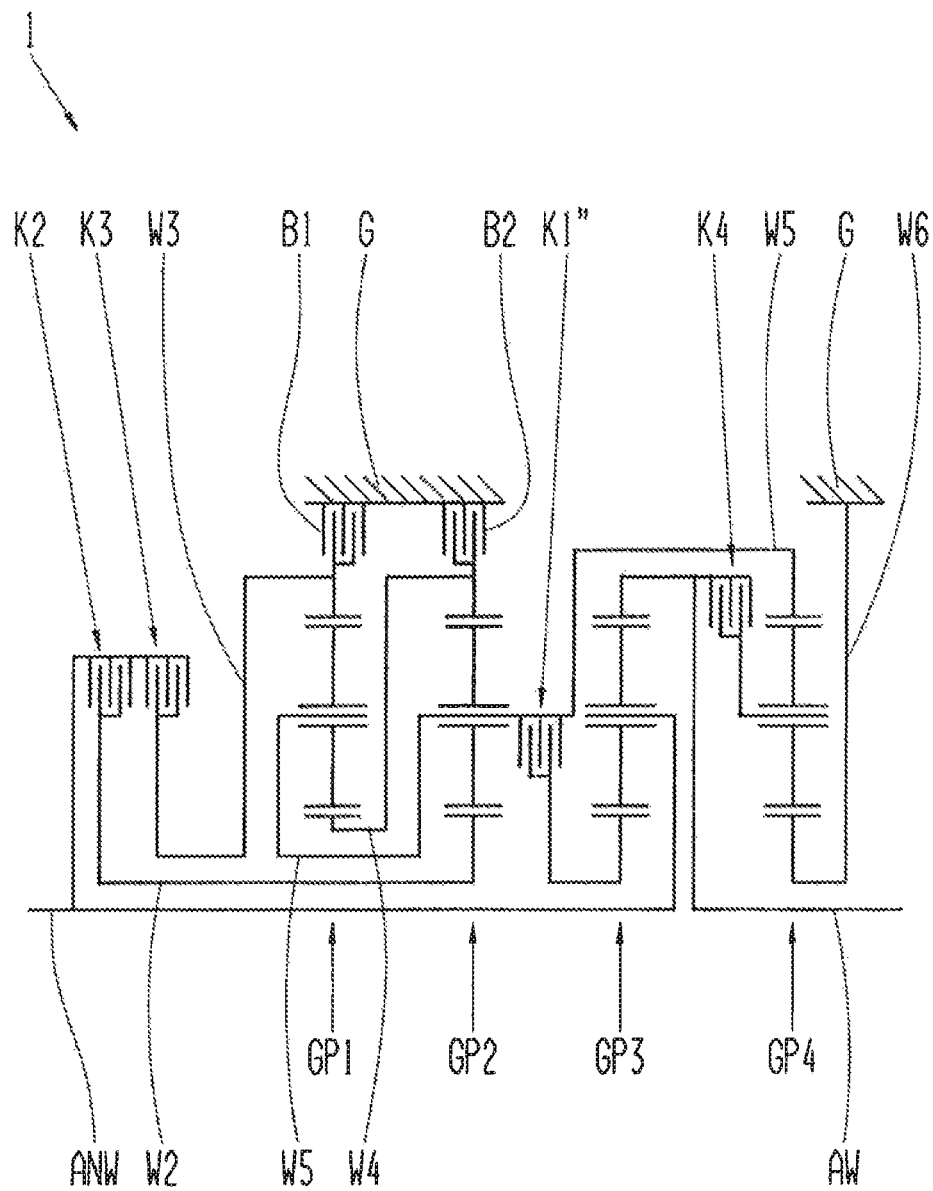
FIG. 6 is a transmission in accordance with a fifth embodiment of the present invention.

FIG. 6 shows a transmission in accordance with a fifth embodiment of the present invention.

FIG. 6 essentially shows a transmission 1 in accordance with FIG. 1. In contrast to the transmission 1 in accordance with FIG. 1, with the transmission 1 in accordance with FIG. 6, the first clutch K1, here designated with the reference sign K1", is now arranged at the second alternative position B in accordance with FIG. 3. The first shaft W1 is omitted. The drive shaft ANW interacts directly with the bar 123 of the third planetary gear set GP3.

Figure 7:
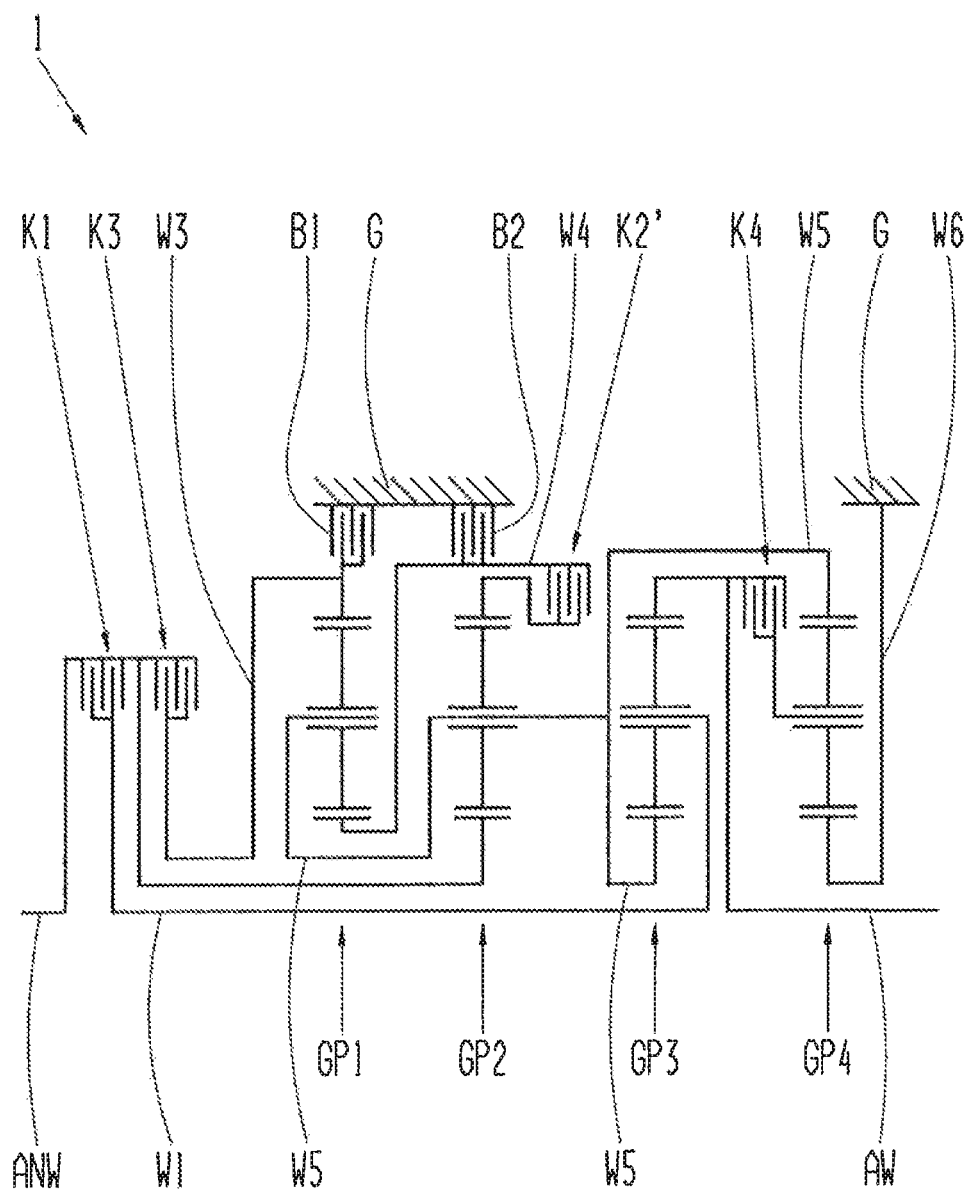
FIG. 7 is a transmission in accordance with a sixth embodiment of the present invention.

FIG. 7 shows a transmission in accordance with a sixth embodiment of the present invention.

FIG. 7 essentially shows a transmission 1 in accordance with FIG. 1. In contrast to the transmission 1 in accordance with FIG. 1, with the transmission 1 in accordance with FIG. 7, the second clutch K2, here designated with the reference sign K2', is now arranged at the alternative position C in accordance with FIG. 4. The second shaft W2 is omitted. The drive shaft ANW interacts directly with the sun gear 102 of the second planetary gear set GP2.

Figure 8:
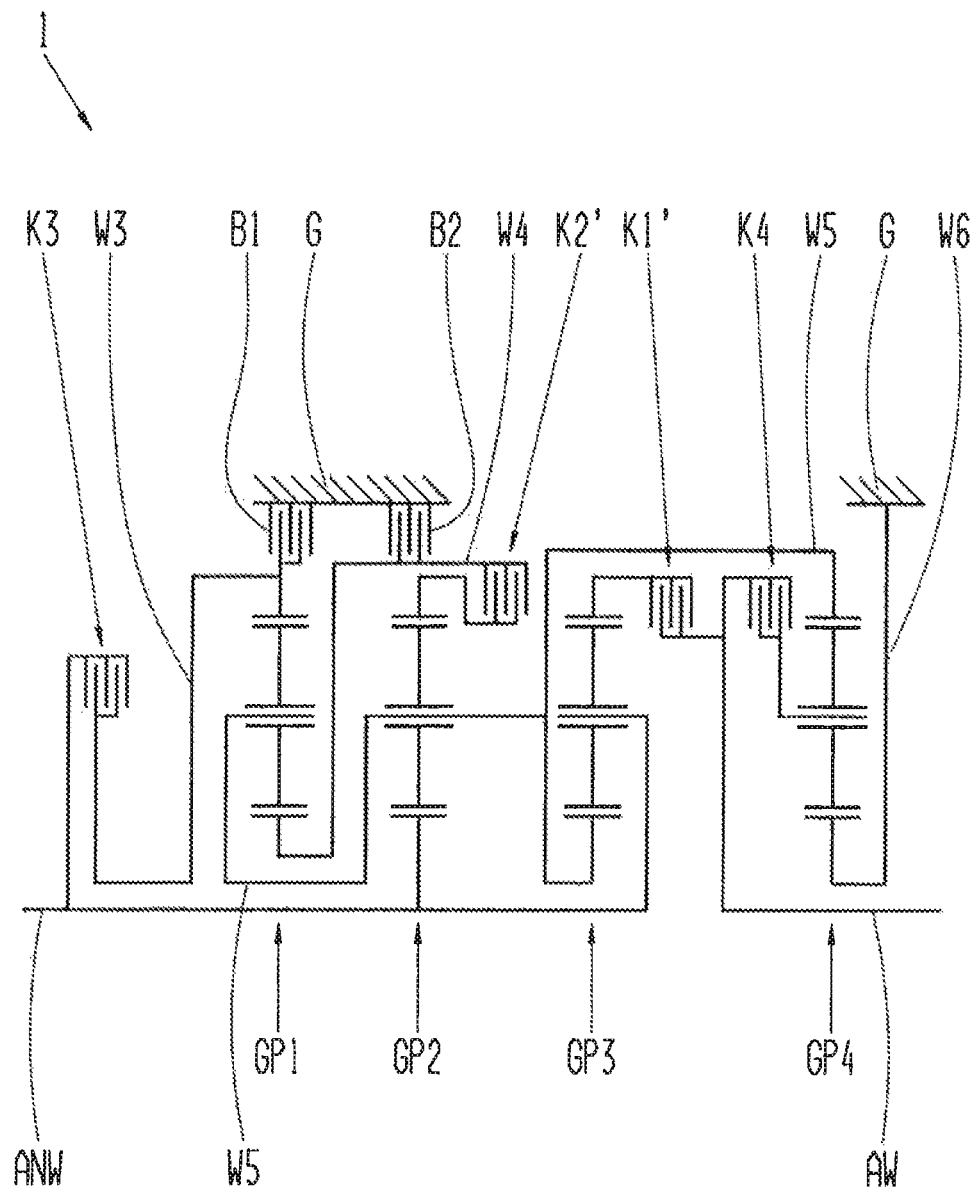
FIG. 8 is a transmission in accordance with a seventh embodiment of the present invention.

FIG. 8 shows a transmission in accordance with a seventh embodiment of the present invention.

FIG. 8 essentially shows a transmission 1 in accordance with FIG. 7. In contrast to the transmission 1 in accordance with FIG. 7, with the transmission 1 in accordance with FIG. 8, the first clutch K1, here designated with the reference sign K1', is now arranged at the first alternative position A in accordance with FIG. 3. The first shaft W1 and the second shaft W2 are omitted. The drive shaft ANW now interacts directly with the sun gear 102 of the second planetary gear set GP2 and the bar 123 of the third planetary gear set GP3.

Figure 9:
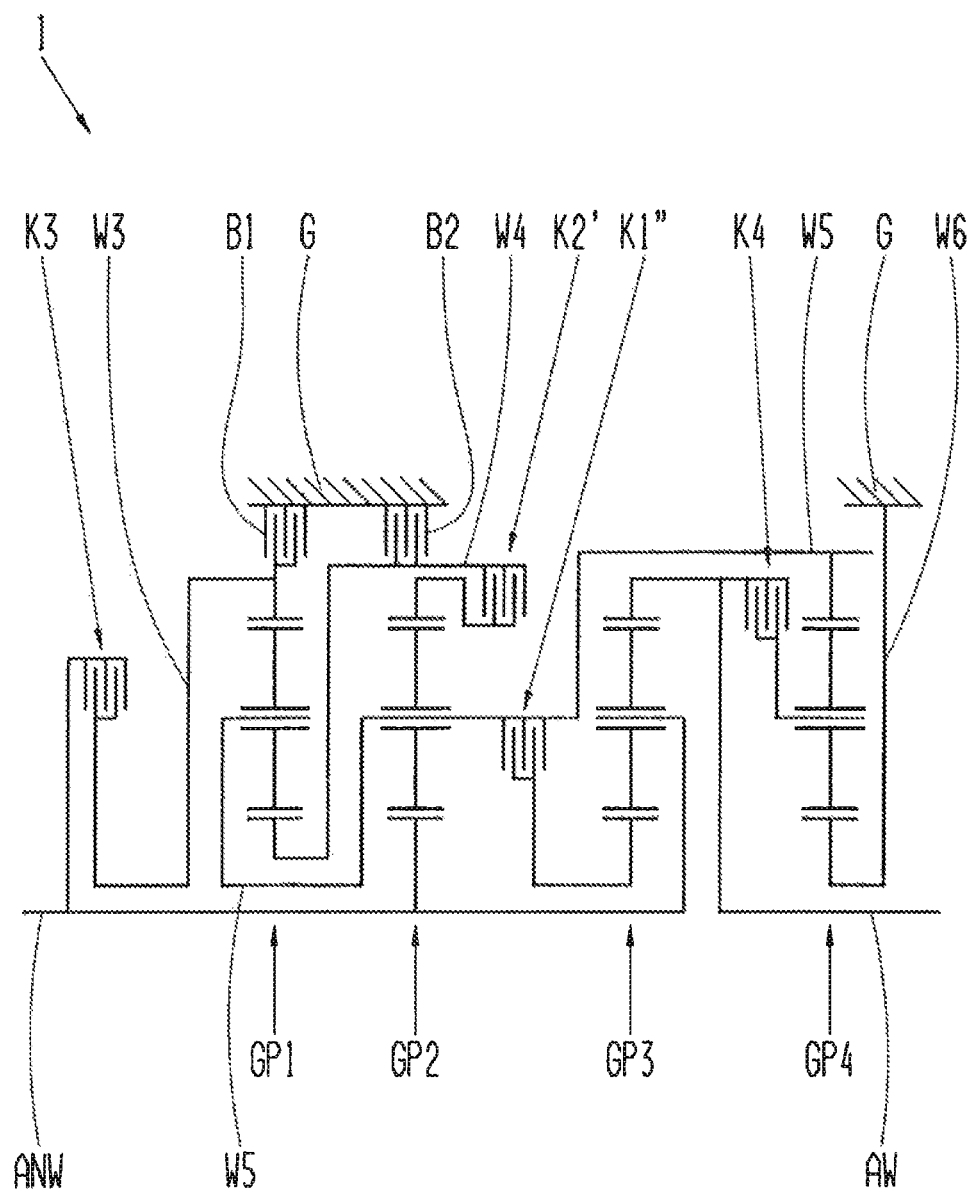
FIG. 9 is a transmission in accordance with an eighth embodiment of the present invention.

FIG. 9 shows a transmission in accordance with an eighth embodiment of the present invention.

FIG. 9 essentially shows a transmission 1 in accordance with FIG. 7. In contrast to the transmission 1 in accordance with FIG. 7, the first clutch K1, here designated with the reference sign K1", is now arranged at the second alternative position B in accordance with FIG. 3. The first shaft W1 and the second shaft W2 are omitted. The drive shaft ANW now interacts directly with the sun gear 102 of the second planetary gear set GP2 and the bar 123 of the third planetary gear set GP3.

Overall, the transmission 1 in accordance with FIGS. 1 to 9 comprises four planetary gear sets GP1, GP2, GP3, GP4, six shift elements B1, B2, K1, K2, K3, K4, whereas the shift elements are designed in the form of at least four clutches and at least two brakes. Furthermore, a maximum of one fixed housing clutch is present. Finally, two shift elements to be shifted simultaneously are arranged.

As a start-up element for the transmission 1, a hydrodynamic torque converter, a hydrodynamic clutch, an additional start-up clutch, an integrated start-up clutch or brake and/or an additional electrical motor can be arranged. An electrical motor or another power source is arranged at each of the six shafts W1 to W6. Moreover, at each of the shafts W1 to W6 or each connection element, a freewheel is arranged for the housing G or for an additional shaft W1, W2, W3, W4, W5, W6. The transmission 1 may be preferentially incorporated into a motor vehicle in standard drive design or in front-transverse design. Frictional-locking or positive-locking shift elements are possible as shift elements. In particular, the clutch K4 may be designed as a positive-locking shift element, in particular as a claw shift element, which leads to significant consumption advantages for a motor vehicle with an internal combustion engine provided with the transmission.

The transmission has a total of at least nine forward gears and at least one reverse gear.

In summary, the present invention offers the advantage that low construction costs are required for the transmission, which results in lower manufacturing costs and a lower weight of the transmission. The transmission also provides a good transmission ratio sequence, low absolute and relative rotational speeds and low planetary set torques and shift element torques. Moreover, the present invention provides good gearing efficiency and very good accessibility of all of the shift elements, in particular regarding their maintenance.

Although the present invention was described above on the basis of preferred embodiments, it is not limited to them, but can be modified in many ways.

For example, the geometric position/order of the individual planetary gear sets GP1, GP2, GP3, GP4, and the individual shift elements K1, K2, K3, K4, B1, B2, K1", K2' may be freely selected under consideration of the binding ability of the respective transmission elements among each other. Individual transmission elements may be arbitrarily moved into their position within the transmission 1.

It is also possible, taking into account binding ability, to convert individual or several planetary gear sets formed as negative planetary gear sets into positive planetary gear sets, with the simultaneous exchange of the bar connection and the ring gear connection and an increase in the stationary transmission ratio by 1.

Modifications and variations can be made to the embodiments illustrated or described herein without departing from the scope and spirit of the invention as set forth in the appended claims.

REFERENCE SIGNS

1 Transmission
GP1, GP2, GP3, GP4 Planetary gear set
101, 102, 103, 104 Sun gear
111, 112, 113, 114 Planetary gear
121, 122, 123, 124 Bar
131, 132, 133, 134 Ring gear
ANW Drive shaft
AW Output shaft
B1, B2 Brake
K1, K2, K3, K4, K1', K1", K2' Clutch
G Housing
V1, V2, V3, V4, V5, V6, V7,
V8, V9, VM', VM", VM''' Forward gear
R Reverse gear
W1, W2, W3, W4, W5, W6 Shaft
W4" Section of the shaft
i Transmission ratio/ratio
φ Gear jump/step
A, B, C Position of clutch

The invention claimed is:

1. A multi-speed transmission for a motor vehicle, comprising:
 a housing (G);
 a drive shaft (ANW);
 an output shaft (AW);
 at least four planetary gear sets (GP1, GP2, GP3, GP4), whereas each of the planetary gear sets (GP1, GP2, GP3, GP4) comprises one sun gear (101, 102, 103, 104), at least one planet (111, 112, 113, 114), one planetary carrier (121, 122, 123, 124) and one ring gear (131, 132, 133, 134);
 a plurality of shift elements (K1, K2, K3, K4, B1, B2) comprising at least four clutches (K1, K2, K3, K4) and at least two brakes (B1, B2);
 the sun gear (104) of the fourth planetary gear set (GP4) connected to the housing (G);
 the planetary carrier of the fourth planetary gear set (GP4) connectable through the fourth clutch (K4) to the output shaft (AW);
 the second brake (B2) connected to the sun gear (101) of the first planetary gear set (GP2);
 the first brake (B1) connected to the ring gear (131) of the first planetary gear set (GP1);
 the ring gear (134) of the fourth planetary gear set (GP4) connected to the planetary carrier (122) of the second planetary gear set (GP2) and to the planetary carrier (121) of the first planetary gear set (GP1); and
 the first brake (B1) connectable through the third clutch (K3) to the drive shaft (ANW).

2. The multi-speed transmission according to claim 1, wherein the planetary gear sets (GP1, GP2, GP3, GP4) are arranged geometrically behind one another in the transmission (1).

3. The multi-speed transmission according to claim 1, wherein:
 the drive shaft (ANW) is connectable through the first clutch (K1) to the planetary carrier (123) of the third planetary gear set (GP3);
 the sun gear (103) of the third planetary gear set (GP3) is connected to the planetary carrier (122) of the second planetary gear set (GP2), to the planetary carrier (121) of the first planetary gear set (GP1) and to the ring gear (134) of the fourth planetary gear set (GP4); and
 the ring gear (133) of the third planetary gear set (GP3) is connected to the output shaft (AW).

4. The multi-speed transmission according to claim 1, wherein:
 the drive shaft (ANW) is connected to the planetary carrier (123) of the third planetary gear set (GP3);
 the sun gear (103) of the third planetary gear set (GP3) is connected to the planetary carrier (122) of the second planetary gear set (GP2), to the planetary carrier (121) of the first planetary gear set (GP1) and to the ring gear (134) of the fourth planetary gear set (GP4); and
 the ring gear (133) of the third planetary gear set (GP3) is connectable through the first clutch (K1') to the output shaft (AW).

5. The multi-speed transmission according to claim 1, wherein:
 the drive shaft (ANW) is connected to the planetary carrier (123) of the third planetary gear set (GP3);
 the sun gear (103) of the third planetary gear set (GP3) is connectable through the first clutch (K1") to the planetary carrier (122) of the second planetary gear set (GP2), to the planetary carrier (121) of the first planetary gear set (GP1) and to the ring gear (134) of the fourth planetary gear set (GP4); and
 the ring gear (133) of the third planetary gear set (GP3) is connected to the output shaft (AW).

6. The multi-speed transmission according to claim 1, wherein the drive shaft (ANW) is connectable through the second clutch (K2) to the sun gear (102) of the second planetary gear set (GP2), and the ring gear (132) of the second planetary gear set (GP2) is connected to the second brake (B2).

7. The multi-speed transmission according to claim 1, wherein the drive shaft (ANW) is connectable to the sun gear (102) of the second planetary gear set (GP2), and the ring gear (132) of the second planetary gear set (GP2) is connectable through the second clutch (K2') to the second brake (B2) and to the sun gear (101) of the first planetary gear set (GP1).

8. A method for operating the transmission (1) of claim 1, the method comprising:
 shifting to a first gear (V1) by an open first brake (B1), a locked second brake (B2), an open first clutch (K1), a locked second clutch (K2), an open third clutch (K3) and a locked fourth clutch (K4)k;
 shifting to a second gear (V2) by an open first brake (B1), a locked second brake (B2), an open first clutch (K1), an open second clutch (K2), a locked third clutch (K3) and a locked fourth clutch (K4);
 shifting to a third gear (V3) by an open first brake (B1), an open second brake (B2), an open first clutch (K1), a locked second clutch (K2), a locked third clutch (K3) and a locked fourth clutch (K4);

shifting to a fourth gear (V4, VM$^I$, VM$^{II}$, VM$^{III}$) by one of:
- an open first brake (B1), an open second brake (B2), a locked first clutch (K1), a locked second clutch (K2), an open third clutch (K3) and a locked fourth clutch (K4);
- an open first brake (B1), a locked second brake (B2), a locked first clutch (K1), an open second clutch (K2), an open third clutch (K3) and a locked fourth clutch (K4);
- a closed first brake (B1), an open second brake (B2), a closed first clutch (K1), an open second clutch (K2), and open third clutch (K3) and a locked fourth clutch (K4); or
- an open first brake (B1), an open second brake (B2), a locked first clutch (K1), an open second clutch (K2), a locked third clutch (K3) and a locked fourth clutch (K4);

shifting to a fifth gear (V5) by an open first brake (B1), an open second brake (B2), a locked first clutch (K1), a locked second clutch (K2), a locked third clutch (K3) and an open fourth clutch (K4);

shifting to a sixth gear (V6) by an open first brake (B1), a locked second brake (B2), a locked first clutch (K1), an open second clutch (K2), a locked third clutch (K3) and an open fourth clutch (K4);

shifting to a seventh gear (V7) by an open first brake (B1), a locked second brake (B2), a locked first clutch (K1), a locked second clutch (K2), an open third clutch (K3) and an open fourth clutch (K4);

shifting to an eighth gear (V8) by a locked first brake (B1), a locked second brake (B2), a locked first clutch (K1), an open second clutch (K2), an open third clutch (K3) and an open fourth clutch (K4);

shifting to a ninth gear (V9) by a closed first brake (B1), an open second brake (B2), a closed first clutch (K1), a closed second clutch (K2), and open third clutch (K3) and an open fourth clutch (K4); and shifting to a reverse gear (R) by a locked first brake (B1), an open second brake (B2), an open first clutch (K1), a locked second clutch (K2), an open third clutch (K3) and a locked fourth clutch (K4).

9. A motor vehicle as a passenger car or a truck, the motor vehicle comprising the multi-speed transmission (1) in accordance with claim 1.

* * * * *